June 2, 1959 R. L. CARBREY 2,889,409
VOLUME COMPRESSION AND EXPANSION IN PULSE CODE TRANSMISSION
Filed Dec. 31, 1956 9 Sheets-Sheet 1

INVENTOR
R. L. CARBREY
BY Harry C. Hart
ATTORNEY

| CODE | VALUE |
|---|---|
| 000000 | 31 |
| 010111 | 8 |
| 011000 | 7 |
| 011001 | 6 |
| 011010 | 5 |
| 011011 | 4 |
| 011100 | 3 |
| 011101 | 2 |
| 011110 | 1 |
| 011111 | 0 |
| 111111 | -0 |
| 111110 | -1 |
| 111101 | -2 |
| 111100 | -3 |
| 111011 | -4 |
| 111010 | -5 |
| 111001 | -6 |
| 111000 | -7 |
| 110111 | -8 |
| 100000 | -31 |

INVENTOR
R. L. CARBREY
BY Harry C. Hart
ATTORNEY

INVENTOR
R. L. CARBREY
BY Harry C. Hart
ATTORNEY

VOLUME COMPRESSION AND EXPANSION IN PULSE CODE TRANSMISSION

Filed Dec. 31, 1956 9 Sheets-Sheet 4

INVENTOR
R. L. CARBREY
BY Harry C. Hart
ATTORNEY

INVENTOR
R. L. CARBREY
BY Harry C. Hart
ATTORNEY

VOLUME COMPRESSION AND EXPANSION IN PULSE CODE TRANSMISSION

Filed Dec. 31, 1956

INVENTOR
R. L. CARBREY
BY Harry C. Hart
ATTORNEY

VOLUME COMPRESSION AND EXPANSION IN PULSE CODE TRANSMISSION

Filed Dec. 31, 1956 9 Sheets-Sheet 7

INVENTOR
R. L. CARBREY
BY Harry C. Hart
ATTORNEY

INVENTOR
R. L. CARBREY
BY Harry C. Hart
ATTORNEY

June 2, 1959 R. L. CARBREY 2,889,409

VOLUME COMPRESSION AND EXPANSION IN PULSE CODE TRANSMISSION

Filed Dec. 31, 1956 9 Sheets-Sheet 9

INVENTOR
R. L. CARBREY
BY Harry C. Hart
ATTORNEY 2,889,409
Patented June 2, 1959

2,889,409

VOLUME COMPRESSION AND EXPANSION IN PULSE CODE TRANSMISSION

Robert L. Carbrey, Madison, N.J., assignor to Bell Telephone Laboratories, Incorporated, New York, N.Y., a corporation of New York Application December 31, 1956, Serial No. 631,806
18 Claims. (Cl. 179—15.6)

This invention relates to the transmission of signals, and particularly to the encoding of signals prior to transmission, to their transmission in coded form and to their recovery by a decoding operation after transmission. Its principal objects are to combine the operation of volume range compression (or expansion) with the coding operation and to combine the operation of volume range expansion (or compression) with the decoding operation.

"Compandor" systems have long been employed in connection with ordinary signal transmission and, more recently, in association with encoding and decoding apparatus for the transmission, e.g. by pulse code, of quantized signals. Such a composite system is described by L. A. Meacham and E. Peterson in the Bell System Technical Journal for January, 1948, vol. 27, page 1. Indeed, companding serves a special purposes in a quantized transmission system in that it reduces the quantization granularity for low amplitude signals, where it would cause serious degradation, at the price of increased granularity for high amplitude signals where it does no harm. The compressor and the expandor normally comprise special units, of more or less complexity, connected in tandem with the coder and the decoder, respectively.

The present invention provides a nonlinear coder and a nonlinear decoder to match it, such that, when these component units carry out their assigned coding and decoding operations, the amplitude range of the coder output signal is automatically compressed, as compared with the range of its input signal, and the amplitude range of the decoder output signal is automatically expanded as compared with the range represented by the code pulse combination with which it is supplied.

The invention takes as its starting point a network of impedance elements connected between an energy source and a reference point in such a fashion as to produce at the reference point an electrical condition proportional to the sum of those elements which are at any moment actuated; and the magnitudes of these elements are such that actuation of any one of them alone increases the magnitude of the electrical condition by a factor 2 as compared with its magnitude due to actuation of the element of next lower order alone. The network may be a current addition network to which voltages are applied and the resulting currents added, in which case the magnitudes of the individual elements are related as the various integral powers of 2. It may equally be a voltage addition network to which currents are applied and the resulting voltages are added, in which case the magnitudes of the elements are such that their sums are related as the various integral powers of 2; i.e., the magnitudes of the individual elements are proportional to the numbers 1, 1, 2, 4, 8, 16. . . . Such a voltage addition network offers certain advantages in practice and will therefore serve as the basis for the greater part of the description which follows. Following that description a brief description will be given of a current addition network and its mode of operation from which, taken with the fuller description of the voltage addition network, extensions of the current addition network will be readily apparent.

The voltage addition network may comprise a group of resistance proportioned in accordance with the foregoing rule and connected together in series so that the voltage measured across all of them is the sum of the voltages appearing across the individual resistors.

Passage of a current of standard (unit) amplitude through any one of these resistors produces a voltage proportional to its magnitude, and so to some power of two. In the decoder, the standard currents are applied in response to the several pulses of an incoming code pulse group, and the network adds those powers of two which correspond to On pulses to give the corresponding decoded amplitude sample. The coder is essentially a decoder with a feedback path around it. In response to timing pulses which occur in regular sequence, various combinations of standard currents are tried until one is found which gives a decoded output which matches the applied input. A pulse is transmitted corresponding to each of the standard currents of this "right" combination.

The present invention introduces into the system as briefly outlined above a nonlinear relation between the binary code pulse combination input to the decoder and its output amplitude; and it does so, in the case of the voltage addition network, by removing the restriction that the injected currents be of standard, uniform magnitude. Rather, they are caused to depart from uniformity in a particular fashion, in dependence on the decoded amplitude, and to such an extent as to give the desired nonlinear relation between input and output. This departure is achieved by feeding back to the control current source, and in a sense effectively to reduce it, an auxiliary signal which is picked off the addition network and hence is proportional to the decoded output. A corresponding modification of a linear decoder of the current-addition form introduces a like nonlinear relation between its output and its input.

The resulting nonlinear decoder becomes a nonlinear coder when, as before, the injected currents are controlled by timing pulses, various combinations being tried until the decoded output is found to match the input signal, a group of pulses being transmitted to represent the correct combination.

Signals such as telephone signals, which are foremost among those requiring companding and encoding for the best transmission, are characterized by positive and negative excursions from a zero level which are of approximately equal amplitudes, and no steady or direct current component. For such signals, apparatus which establishes a monotonic nonlinear relation between input and output does not suffice. Rather, it is required that the relation shall be symmetrical about the zero amplitude of the signal so that positive and negative excursions of the signal shall be treated alike from the companding standpoint while being, of course, distinguishably coded and unambiguously decoded.

The apparatus of the invention secures this result by injecting negative control currents for positive signal amplitudes and positive control currents for negative signal amplitudes. The feedback which is responsible for the nonlinear behavior is still, in all cases, degenerative; opposite in sign to the control currents. Thus it is of positive sign for positive signal amplitudes and of negative sign for negative signal amplitudes. In the fashion the desired nonlinear relation is achieved in the same fashion and to the same extent for negative signal amplitudes as for positive, while the difference of polarity of the signal amplitude is still unambiguously reflected in a corresponding difference in the code pulse group, whether the system be working from signal amplitude to code pulse group, as in a coder, or from pulse group to signal amplitude, as in a decoder.

The invention will be fully apprehended from the following detailed description of preferred embodiments thereof taken in connection with the appended drawings in which.

Figure 1:
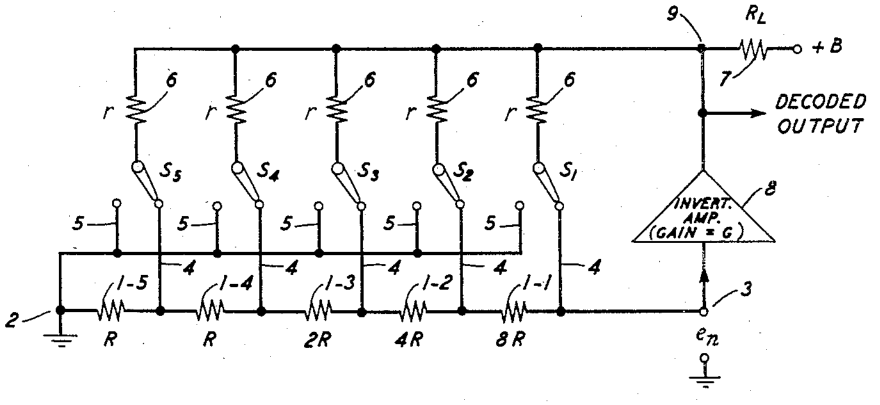
Fig. 1 is a schematic circuit diagram showing a nonlinear addition network and illustrating the principles on which the invention is based.

Referring now to the drawings, Fig. 1 shows an addition network of known configuration which has been modified to carry out the objects of the invention. It comprises a group of resistors 1 connected in series between a ground-point 2 and a terminal point 3. Their magnitudes are R, R, 2R, 4R, 8R, respectively. Taps 4 are connected to the off-ground terminal of these several resistors, and switches $S_1$, $S_2$, $S_3$, $S_4$, $S_5$ are arranged either to engage these taps or to engage ground terminals 5 instead. Each switch is connected by way of a high resistor 6 of magnitude *r*, and by way of a common load resistor 7, of resistance $R_L$, to a source of potential B. The input terminal of a phase-inverting amplifier 8 of gain factor G is connected to the terminal point 3,and the output terminal of this amplifier is connected to the point 9 which is common to the resistor $R_L$ and the several resistors 6. In this figure, and in other figures and in the description to follow, when any one of the switches S is referred to as being "open," it is open from the standpoint of the network of resistors 1, but is nevertheless closed to ground from the standpoint of the potential source B. This is to prevent unwanted alteration of the voltage drop across the resistor $R_L$ which would occur if the switch were literally and from all standpoints "open." Contrariwise, reference to one of these switches as "closed" is to be taken as meaning that the source B is connected through it to the resistor network and not directly to ground.

Disregarding, for the present, the load $R_L$ and the feedback amplifier 8, the operation of the network is as follows. Suppose the digit group 00001, representing the value unity, in the conventional binary code, is to be decoded. This means that the switch $S_5$ is to be closed, the others remaining open. A standard current then flows from the source B through the resistor 1—5, of magnitude M to ground, producing a voltage drop of 1 volt across the series network. Suppose, second, that the digit group to be decoded is 10000, representing the value 16. This means that the switch $S_1$ is to be closed, the others remaining open. A standard current now flows through the entire network to ground, producing a voltage drop across it of 8+4+2+1+1=16 volts. Thus the circuit gives an output which is directly proportional to the magnitude represented by the input code digit group.

Consider, now, the modification which results when account is taken of the load $R_L$ and the inverting amplifier 8. The latter receives at its input terminal 3 a signal proportional to the entire voltage drop across the series resistor network, whatever the magnitude of this voltage drop may be. It increases the magnitude of this voltage drop by a factor G and inverts its sign, and applies the resulting signal to the common terminal 9. In the first case cited above it thus receives an input signal whose magnitude, to a first approximation, is 1 volt. Its output, $-G$ volts, is applied to the load resistor $R_L$ in a fashion effectively to reduce the potential of the source B and therefore to reduce the current injected through the switch $S_5$. This action reduces the voltage drop across the resistor 6 somewhat below 1 volt, and so produces a small compression of the amplitude of the signal output of the system as compared with its input signal.

In the second case cited the initial input to the amplifier is sixteen times as great. To a first approximation, therefore, its output is $-16G$ volts. This auxiliary signal modifies the effective magnitude of the potential source B sixteen times as much, and so effects a reduction in the standard current flowing through the switch $S_1$ which is sixteen times as great as the reduction effected in the first case of the current flow through the switch $S_5$. But this reduction of the injected current results in a corresponding reduction in the voltage drop across the resistance network so that the network voltage becomes in fact substantially less than 16 volts, and the reduction of this large amplitude output is much more than in proportion to the reduction, in the first case discussed, of the small amplitude output. Hence the amplitude compression of the output signal as compared with the input signal is much greater for large signals than for small ones.

Corresponding behavior can be traced for each of the thirty-two possible combinations of closures of the switches $S_1$, $S_2$, $S_3$, $S_4$ and $S_5$. In each case the output voltage is first amplified by a factor $-G$ and the amplified voltage is employed to reduce the effective magnitude of the current source B. As the effective magnitude of the current source is reduced the magnitude of each standard current which flows on closure of any of the switches S is correspondingly reduced. As a result, the larger the magnitude of the voltage drop across the series adding network, the smaller becomes the next step of increase of such voltage drop.

In the limit, the amplified network voltage could be made equal to the voltage of the current source B, thus completely nullifying its effect, so that no current would flow through the control current resistors *r*. This would amount in effect to an infinite volume range compression. For practical purposes a more reasonable range compression of the order of 10–30 decibels is preferred. The manner in which a desired range compression is obtained will be seen from the following analysis, derived for the case in which each of the control resistors 6 has a magnitude much larger than R, the unit resistance of the adding network. The analysis holds, to a good approximation, for the practical case in which the resistance of each resistor 6 is high compared with the resistance of all the resistors 1.

Denoting by *i* the current through any of the standard current resistors *r* and by *n* the decimal number equivalent of the code combination, then the voltage $e_n$ at the output terminal of the binary addition network is $niR$. Because the inverting amplifier has a gain G, this voltage $niR$ at its input terminal causes a voltage of $-niRG$ to be developed across the load resistor $R_L$. This voltage is opposed to that of the standard current source B. Hence the current source is in effect reduced to $B-niRG$. From this the resulting standard current and network voltage can be determined. Thus $$i=\frac{B-niRG}{r}$$

and $$B=ir+niRG$$

whence $$i=\frac{B}{r+nRG}$$

The network voltage is established by this current flowing effectively through $n$R units of resistance. Hence $$e_n=niR=\frac{BnR}{r+nRG}$$

Let $$r=kR$$

Then $$e_n=B\frac{n}{k+nG}$$

This indicates that the voltage developed across the network of resistors 1 varies hyperbolically with $n$.

Figure 2:
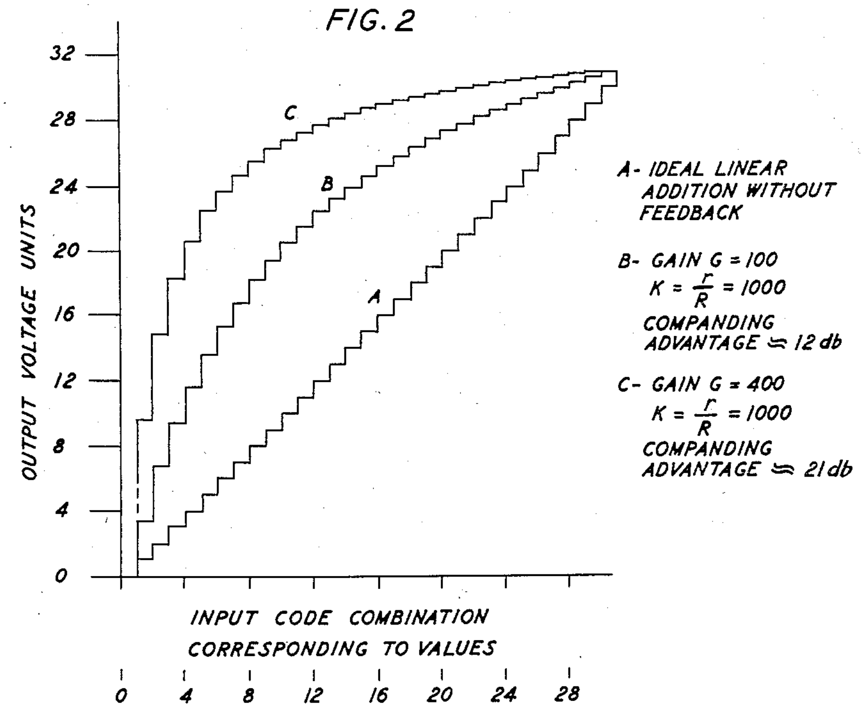
Fig. 2 is a group of input-output characteristics which may be obtained with the circuit of Fig. 1.

In Fig. 2 curve A shows the uniformly stepped relation which holds for the apparatus of Fig. 1 when the feedback path of the present invention is disabled. Except for its stepped character, the relation which holds between the voltage across the adding network and the magnitude to which the input code digit group corresponds is evidently a linear one.

Curve B of Fig. 2 is a plot of the characteristic which would be obtained with an amplifier gain of $G=100$ and a ratio $k=r/R=1000$. The companding advantage of such a network used in a coder and a decoder is about 12 db, which is equivalent to an increase in the number of digits in the code from five to seven for the low level input signals. Curve C of Fig. 2 shows the effect of increasing the amplifier voltage gain to $G=400$. In this manner the companding advantage is increased to about 21 db. Similar curves are obtained with smaller values of $k$ and of G, at the price, however, of an increase in the small errors in step size which do not appear in the above simplified formula because it does not take account of the changes of voltage across the addition network.

As shown by the curves of Fig. 2, the circuit of Fig. 1 produces a stepped nonlinear relation between input and output for signals which are always positive. Evidently, by employing a current source of opposite sign, a like relation could be obtained for signals which are always negative. But the signals of principal interest, such as telephone voice currents, are sometimes positive and sometimes negative, their steady or D.-C. values being zero. It is tempting, for such a case, to seek to combine apparatus manifesting a relation as illustrated by curve C of Fig. 2, in the first quadrant, with similar apparatus manifesting a relation illustrated by its mirror image in the third quadrant, thus to produce a composite curve which is symmetrical about the axis of zero signals. But this alone would not serve the purpose of quantized companding, for the reason that the composite curve would have large steps, upward or downward, for small signals, positive or negative, and small steps for large signals. What is required, to the contrary, of the symmetrical nonlinear stepped curve is that the smallest steps be closest to the zero axis and that the steps increase in magnitude, upward for positive signals and downward for negative signals alike. The invention provides an arrangement by which this result is secured. It will be described in detail below. In the interim, it will be explained how the nonlinear addition principle, illustrated by Fig. 1, may become the basis of a coder, as distinguished from a decoder, and how such a coder may accept, and encode, signal samples of negative or of positive polarity with equal facility.

Figures 3, 4, 5:
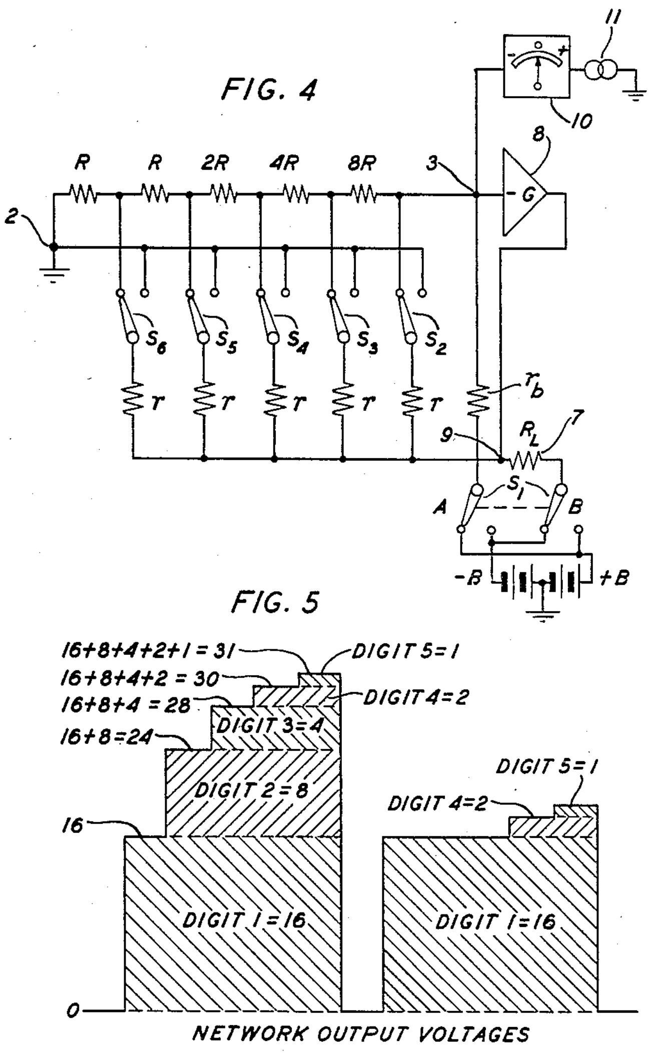
Fig. 3 is a tabulation illustrating a permutation code appropriate for use with the invention.
Fig. 4 is a schematic circuit diagram illustrating the manner in which the circuit of Fig. 1 may be employed to carry out a nonlinear coding operation on a bipolar signal.
Fig. 5 is a diagram of assistance in explaining the operation of the invention.

Consider the code tabulated in Fig. 3, in which each code element appears either as a "1" or as a "0." In each group the code elements are written from left to right in descending denominational order so that the first or left-hand digit is that of greatest significance and the last or right-hand digit is that of least significance. It will be observed that in the case of every negative signal value the first digit is a "1" and that in the case of every positive value the first digit is a "0." It will also be observed that, with this exception, the code group representing any negative value is identical with the code group representing the positive value having the same absolute magnitude. In other words, with the exception of the first digit, the entire tabulation for negative values is an image, reflected in the zero axis, of the tabulation for positive values. The code departs from conventional form, furthermore, in that the code groups representing small amplitudes, positive or negative, are characterized by a large proportion of 1's, while the code groups representing large amplitudes are characterized by a large proportion of 0's. Thus +0 is represented by 01111 and −0 is represented by 11111.

The process of generating the code of Fig. 3 with apparatus employing a network such as that of Fig. 1 consists essentially in applying various code element groups to the various switches S in systematic succession to generate corresponding decoded values which are matched, in turn, against the signal amplitude to be coded. When the best such match has been obtained the pattern of switch closures which produces it represents the code counterpart of the signal amplitude thus matched. This trial-and-error process is illustrated in Fig. 4 which shows a network of series-connected resistors of magnitudes R, R, 2R, 4R and 8R connected between a ground point 2 and a take-off point 3 as in Fig. 1. Also, as in Fig. 1, a switch S interconnects the off-ground end of each resistor of this network and through a control resistor of magnitude $r$, preferably high, and a load resistor $R_L$ to a potential source +B or −B. Again as in Fig. 1 a phase inverting amplifier 8 interconnects the take-off point 3 to the point 9 which is common to the load resistor $R_L$ and the control resistors $r$. Fig. 4 differs from Fig. 1 in the following respects: a double-pole double-throw switch $S_1$ is provided of which the "B" arm may connect the load resistor $R_L$ either to the positive potential source, +B or to the negative potential source, −B. The two arms of the switch are intercoupled in such a fashion that when the load resistor is connected by the "B" arm to the positive source +B, the negative source −B is connected by way of the "A" arm through a bias resistor $r_b$ to the off-ground terminal 3 of the adding network, and vice versa. In addition, the off-ground terminal 3 of the adding network is connected through a zero-center meter 10 and through a signal source 11 to ground.

Assume, now, that the rest condition of the apparatus, corresponding to a signal of the smallest amplitude, is with all of the "S" switches thrown to the left, i.e., closed, as shown in the drawing. Closure of the "S" switches means that the voltage drop across the adding network has its largest magnitude. Closure of the "B" arm of the $S_1$ switch to the left means that the sign of this voltage drop is negative. Closure of the "A" arm of the $S_1$ switch to the left means that this network voltage drop is balanced by a positive bias supplied through a bias resistor from the source +B. As explained above in connection with Fig. 1, the condition in which all control switches S are closed, producing the largest possible voltage drop across the adding network is that in which, by virtue of the feedback of the invention, the voltage increment which results from opening any one switch has its smallest magnitude.

Assume, now, that it is desired to utilize this apparatus to encode a signal amplitude sample of unknown magnitude and polarity. The signal is applied from the source 11 to the meter 10 whose needle is deflected. If the needle is deflected to the left, meaning that the signal is negative with respect to the potential of the point 3, an On pulse should be transmitted and the two-arm switch $S_1$ should be thrown to the right, thus reversing the polarities of all the control currents and of the bias. If, on the other hand, the needle is deflected to the right, indicating that the signal is positive with respect to the potential of the point 3, no pulse should be transmitted and the two-arm $S_1$ switch should remain in the position shown.

Next, taking the other control switches in order, the switch $S_2$ is thrown to the right. This stops the flow of that control current which previously flowed through the entire resistor network 8R+4R+2R+R+R and so reduces the network voltage drop, positive or negative, and causes the amount of needle deflection to change. A deflection to the left means that the signal voltage is negative relative to the new, modified potential of the point 3, while a deflection to the right means that it is more positive. Hence an absolute value difference in favor of the signal is indicated by a right-hand deflection for a positive input signal and by a left-hand deflection for a negative input signal.

Assuming that the signal is negative as indicated by the first test, and that the deflection is to the right, indicating a signal (absolute) magnitude less than the test voltage at the point 3, a second On pulse is transmitted, the switch $S_2$ is closed again and a third test is similarly made by opening the switch $S_3$. The same operations take place for a positive signal sample which is less than the new test voltage, this condition being indicated by a needle deflection to the left. If the second test had indicated that the (absolute) signal sample amplitude was in excess of the test voltage, the switch $S_2$ would have remained open and an Off pulse (no On pulse) would have been transmitted. The third test would then proceed as above indicated, and after it the fourth, the fifth, and so on. For each test, if the indication is that the absolute magnitude of the signal is less than the test voltage, the switch is returned to its closed position and an On pulse is transmitted. If the test indicates that the absolute magnitude of the signal sample exceeds the test voltage, the switch remains open and no On pulse is transmitted.

Continuation of this process results in successive comparisons of the signal amplitude, first with a magnitude of sixteen units, then with a magnitude of eight or twenty-four units, then with a magnitude of four, twelve or twenty-eight units, and so on until by trial and error there is found a switch configuration that produces a decoded amplitude which most nearly matches the signal amplitude sample. In the course of these successive comparisons, each time the absolute magnitude of the signal sample is found not to exceed the test voltage a pulse is to be transmitted, and each time it is found to exceed the test voltage no pulse is to be transmitted.

Fig. 5 illustrates the effects of these operations in the absence of the feedback of the invention. Here the test voltages corresponding to the successive digits are shown as blocks placed one above the other, each block being of one-half the height of the block immediately below it. In the presence of the feedback of the invention, however, the magnitudes of the voltages corresponding to these blocks are reduced in proportion to the number and significance of the blocks of which the test voltage is composed.

Figure 6:
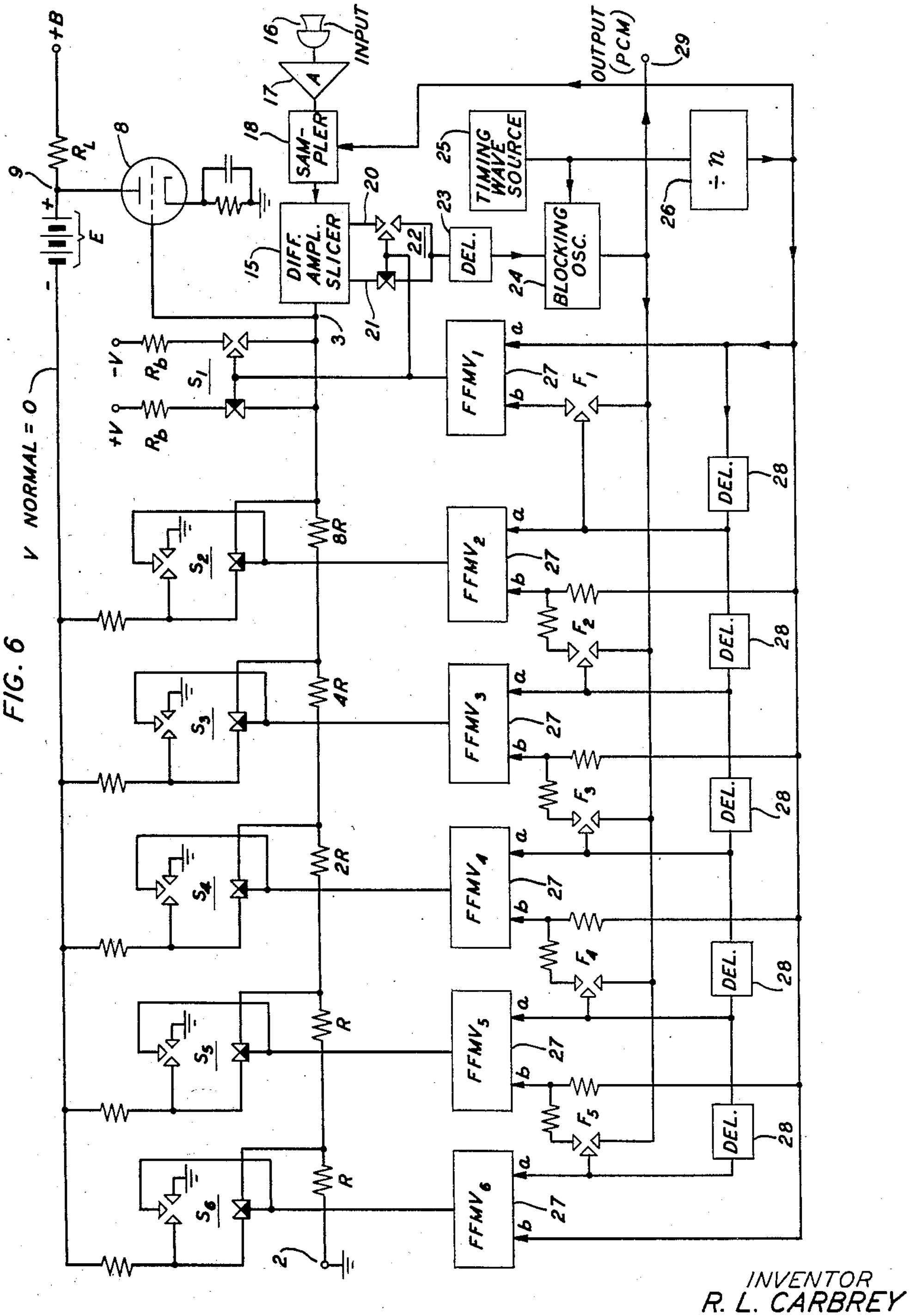
Fig. 6 is a schematic circuit diagram showing a nonlinear bipolar-signal coder embodying the invention.

Fig. 6 shows a circuit arrangement for automatically carrying out the operations discussed in connection with Fig. 4. The adding network of resistors is connected as before between a ground point 2 and a test point 3, to which is connected the input terminal of an inverting amplifier 8, namely to the grid of a tube whose cathode is grounded through a bias resistor, bypassed by a condenser, and whose anode is connected to the load resistor $R_L$. The off-ground terminal of each resistor R is supplied with control current by way of an "S" switch and a resistor *r* from a source B+, through a load resistor $R_L$ and a supplementary source E. Two bias sources +V and −V are connected, in the alternative, to the test point 3 in dependence on whether the switch $S_1$ is thrown to the left or to the right. As a consequence of these connections the currents which flow through the resistors *r*, and consequently the voltage drops across the adding resistor network, may be either positive or negative, and the maximum value of this voltage drop, when all the S switches are closed, is balanced by the bias applied to the end of the network through the $S_1$ switch, from the positive source +V to balance the negative drop, or from the negative source −V to balance the positive drop. To secure this balance bias resistors $R_b$ should be adjusted to make the magnitude of the voltage drop across the network due to bias sources +V and −V equal to or slightly in excess of the maximum voltage drop across the adding network.

In Fig. 6 and in others to follow the various switches are illustratively represented in accordance with a convention in which two oppositely directed arrowheads represent the two conduction terminals of the switch while a third arrowhead, directed perpendicularly toward the line joining the first two, represents the control terminal of the switch. When a switch is normally open, to be closed by energizing the control terminal, the third arrowhead is shown in outline and removed from the first two. When a switch is normally closed, to be opened by actuation of the control terminal, the third arrowhead is shown solid and in contact with the first two.

The end point of the adding network is connected to one input terminal of a differential amplifier or comparison slicer 15 while the signal source, here represented by a microphone 16, is connected by way of an amplifier 17 and a sampler 18 to the other input terminal of this unit 15.

This unit 15 may comprise a single-trip multivibrator, to the grid of one tube of which the end point of the adding network is connected, while the signal source is connected to a corresponding grid of the other tube. With this arrangement, tripping of the multivibrator from either of its two stable conditions to the other is determined by the potential difference, taking account of polarity, between the resistor network voltage and the signal sample voltage, rather than by the absolute magnitude of either one of these voltages.

This unit 15 delivers a potential of preassigned polarity on a first output terminal 20 when the voltage drop across the adding network is positive with respect to the signal amplitude sample, and a similar potential on its other output terminal 21 under the opposite condition. Each of these potentials is converted to a pulse by a switch 22. This pulse may be standardized in amplitude and instant of occurrence, i.e., it may be regenerated, as by a blocking oscillator 24 to which are supplied pulses from a timing wave source 25, which delivers a train of pulses recurring at the code element rate.

The output pulses of the timing wave source 25 control the timing of the blocking oscillator 24. A divider 26, such as a single trip multivibrator with a controlled recovery interval, derives from this pulse train another train of pulses which recur at the pulse group rate, i.e., the signal sample recurrence rate. Each pulse of this group rate train controls the operation of the sampler 18 which may include provision for holding the amplitude of each signal sample until the occurrence of the next one. The same group rate pulses are applied in common and simultaneously to the *b* trigger terminals of all of a group of flip-flop multivibrators 27 thus to reset them, immediately prior to each encoding operation, to a standard condition in which their outputs drive the several S switches to the positions shown in which the $S_1$ switches and the differential amplifier output switch 22 are thrown to the left, the remaining S switches are closed, and the other switches are open. This condition of the S switches, other than the switch $S_1$, means maximum voltage drop across the adding network and, because of the nonlinearizing feedback, smallest incremental change in this voltage due to operation of any S switch. The condition of the $S_1$ switch means that this voltage drop is negative in sign, and that it is balanced by a positive bias from the source +V, so that the potential of the end point 3 of the adding network is zero.

The same group rate pulses are also passed through a sequence of delay devices 28 each of which delays each such pulse by one code element interval, and the output terminals of the several delay devices are connected to the control terminals of auxiliary reset switches $F_1$ to $F_6$ in one-to-one relation; that is to say the output terminal of the first delay device is connected to the control terminal of the switch $F_1$, that of the second to the control terminal of the switch $F_2$, and so on. This arrangement operates to establish conducting paths through the F switches in sequence, one at a time. Each such conduction path, when thus established, permits the application of a pulse from the output point of the blocking oscillator 24 to the reset input trigger terminal of one of the flip-flop multivibrators 27, thus to switch it from its test or "B" conduction condition to its rest or "A" conduction condition.

Each time the first flip-flop multivibrator $FFMV_1$ delivers an output pulse, as determined by application of a group rate pulse from the divider 26 to its *a* input point, it reverses the $S_1$ switch, thus removing the positive bias +V from the network output point and replacing it by the negative bias −V. At the same time it reverses the auxiliary differential amplifier switch 22, thus applying pulses, when they exist, from the right-hand output point 20 of the differential amplifier 15 to the blocking oscillator 24. Each time one of the other flip-flop multivibrators 27 delivers an output pulse, as determined by application of a group rate pulse through a delay device to its *a* input point, it opens the corresponding S switch. On removal of the flip-flop multivibrator output pulse, by application of a control pulse to its *b* input point, the S switch is closed again.

With the apparatus in its rest condition and the potential of the end point 3 of the network consequently zero, suppose a positive signal sample of unknown amplitude be applied from the source 16, by way of the sampler 18, to the differential amplifier 15. This means that the differential amplifier 15 delivers an output pulse at its right-hand output terminal 20 but not at its left-hand output terminal 21. The right-hand output terminal 20 is on open circuit, while the left-hand output terminal 21 is connected by way of the switch 22 and a delay equalizer 23 to the input point of the blocking oscillator 24. Hence the blocking oscillator 24 is not tripped and the first digit of the code pulse group is an Off pulse or "0" as called for by the tabulation of Fig. 3. This pulse appears at the output terminal 29 of the apparatus. The settings of the switches therefore remain unchanged for the next comparison.

After the lapse of one code element interval, the group rate reset pulse will have passed through the first of the delay unit 28 and appears at the *a* trigger terminal of the second flip-flop multivibrator $FFMV_2$ to trip it, thus opening the switch $S_2$ and so reducing the voltage drop across the resistor network and bringing the potential of the test point 3 to a new (positive) value for the second trial of the magnitude of the signal sample. If the signal sample is more positive than this new test value, the blocking oscillator 24 receives no pulse from the differential amplifier 15 and delivers a "0" or Off pulse for the second digit of the code pulse group and the switch $S_2$ remains open. If, to the contrary, the signal sample is less positive than the potential of the test point 3, the differential amplifier 15 delivers a pulse to the blocking oscillator 24, an On pulse is delivered to the output terminal 29 of the apparatus and, through the switch $F_2$, now closed by the group rate pulse after two code element intervals, to the left-hand trigger terminal of the second flip-flop multivibrator $FFMV_2$ whose output in turn restores the switch $S_2$ to its closed position, thus preparing the apparatus for a third comparison of the signal sample amplitude with the third test value of the potential of the test point 3. The same group rate pulse is applied to the *a* trigger terminal of the third flip-flop multivibrator, thus to make the third test of the signal amplitude.

Proceeding in this fashion the amplitude of the signal sample is compared with successive test point potentials by successive openings of the S switches. Each time the absolute magnitude of the signal sample exceeds the test voltage the corresponding S switch remains open and the corresponding digit of the code pulse group is delivered to the output terminal 29 as an Off pulse. Each time, to the contrary, that the absolute magnitude of the signal sample is less than the test potential the corresponding S switch is closed again and the corresponding digit is delivered to the output terminal 29 as an On pulse.

Figure 8:
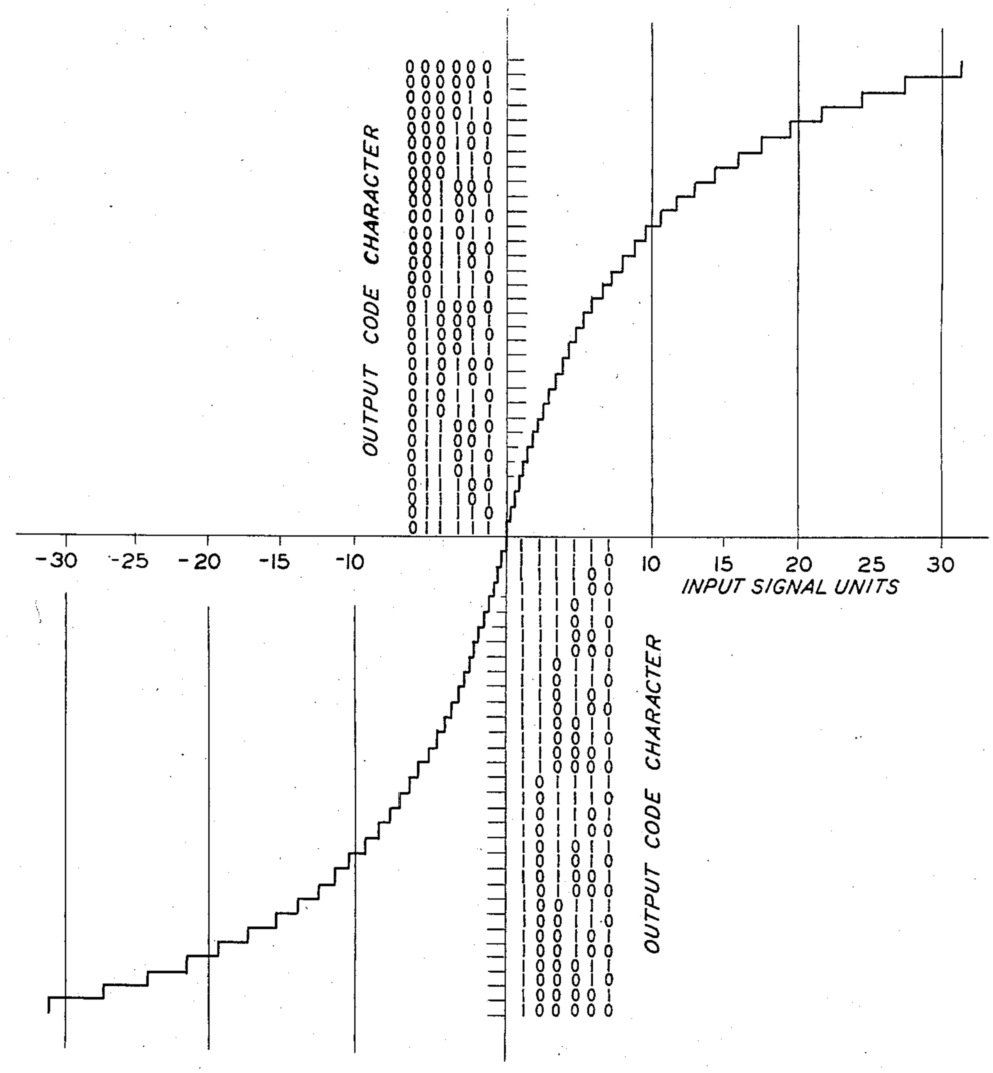
Fig. 8 is a balanced input-output characteristic obtainable with the coder of Fig. 6.

From this behavior it follows that the largest positive signal sample amplitude is coded in the form 00000 . . . and similarly the largest negative signal sample amplitude is coded as 10000 . . . in conformity with the tabulation of Fig. 3. More particularly, the polarity of the sample is represented by the first digit of the code pulse group, an On pulse representing negative polarity and an Off pulse representing positive polarity, while the absolute magnitude of the sample, positive or negative, is represented by the remaining digits of the code pulse group. The resulting input-output characteristic of the coder of Fig. 6 is shown in Fig. 8.

At the conclusion of the time allotted to the coding of each signal sample, the group rate pulse output of the divider 26 operates to reset all the switches to the rest condition as described above and operates at the same time to take a new sample of the signal to be coded.

Figure 7:
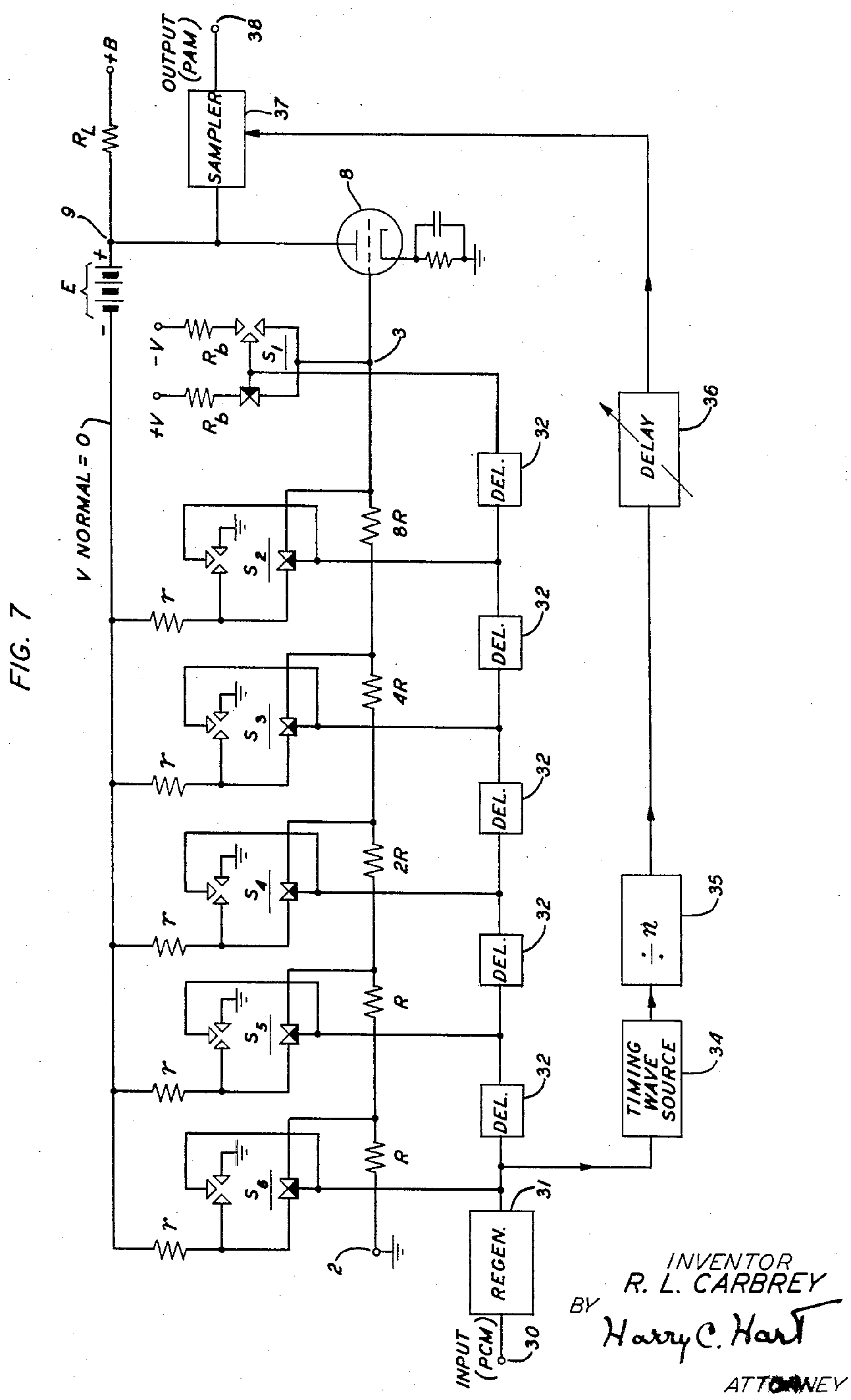
Fig. 7 is a schematic circuit diagram showing a nonlinear bipolar-signal decoder embodying the invention.

Fig. 7 shows a decoder embodying the nonlinear addition principles of Fig. 1 in a fashion to exhibit an expandor characteristic as between a code pulse group applied to it as an input signal and the resulting decoded output. As with the other figures it comprises a group of resistors R, R, 2R, 4R, 8R . . . connected in series between a ground point 2 and a test point 3. This test point 3 is connected to the input terminal of an inverting amplifier 8, e.g., to the grid of a tube whose cathode is grounded through a bypassed bias resistor and whose anode is connected to a load resistor $R_L$. The off-ground terminal of each resistor of the network is supplied with control current by way of an "S" switch and a resistor *r* from a source B+, through the load resistor $R_L$ and a supplementary source E. Two bias sources, +V and −V are connected, in the alternative, to the off-ground terminal 3 of the resistance network in dependence on whether the switch $S_1$ is thrown to the left or to the right. As a consequence of these connections the currents which flow through the resistors *r*, and consequently the voltage drops across the adding resistor network, may be either positive or negative, and the maximum value of this voltage drop, which obtains when all the S switches are closed, is balanced by the bias applied through the $S_1$ switch, from the positive source +V to balance the negative drop, or from the negative source −V to balance the positive drop. To secure this balance bias resistors, $R_b$, should be adjusted to make the magnitude of the voltage drop due to the bias sources +V and −V equal to or slightly in excess of the maximum voltage drop across the adding network.

A degenerative feedback path interconnects the off-ground terminal 3 of the resistor network with the current source +B and comprises the phase-inverting amplifier 8 of gain factor G. Its effect, as in Fig. 1, is to modify the magnitudes of the currents drawn through the S switches in dependence on the magnitude of the voltage drop across the resistor network. This voltage drop has its greatest magnitude, positive or negative, when the switches $S_2$, $S_3$, etc. are all closed. When, in addition, the $S_1$ switch is closed to the left the network voltage drop is negative and it is balanced by a positive voltage from the bias source —V. Similarly, when the $S_1$ switch is thrown to the right the network voltage drop is positive and this positive network voltage drop is balanced by a negative bias from the bias source —V. Incoming pulses, arriving at the terminal 30, may be regenerated by a unit 31. The $S_1$ switch is operated by the first pulse of each incoming code group. The variously numbered switches $S_2$, $S_3$, etc. are operated by the similarly numbered pulses of the remainder of the group. The code pulse group, in which the pulses are normally arranged in time sequence on a single transmission channel, are brought into time coincidence and applied to these several switches by a distributor which may comprise a group of single-element delay devices 32 connected together in tandem, with a tap extending from each junction point to the corresponding S switch.

Suppose, first, that the signal sample coded at the transmitter station, and for which the code pulse is transmitted and is to be decoded, has the smallest positive value, namely +0. Referring to Fig. 3, this code pulse group is 011111. Application of the first digit Off pulse to the $S_1$ switch holds it in its left-hand position, thus applying a positive bias to the network output point and preparing for the application of negative voltage drops through the resistors of the network. Application of the remaining On pulses of this code pulse group to the S switches closes all of them, thus producing a negative voltage drop across the network proportional to $16+8+4+2+1=31$. This negative voltage drop is balanced by the positive bias from the source +V to produce a network potential, at the network output point, of zero.

Because under this condition the network voltage drop has its greatest magnitude and the degenerative feedback due to the phase-inverting amplifier has its greatest effect, this is the condition in which a change in the input code has the smallest effect on the decoded output; i.e., the decoder has low sensitivity for small signal sample amplitudes. More particularly, if one or more of the switches $S_1$ through $S_6$ were left in the open condition due to the reception of a "0," the network voltage drop would be decreased because fewer standard current sources would be connected to it. As a result the voltage of the test point 3 would rise because of the positive bias applied to it via the switch $S_1$. This rise in voltage on the grid of the inverting amplifier 8 would cause the inverting amplifier to develop a less positive voltage at its output terminal 9. This in turn would cause the slight negative voltage at the negative terminal of potential source E to become even more negative with respect to the ground reference point 2. As a result the currents through each of the standard current resistors would increase. The effect of the standard currents on the developed network voltage would thereby be increased, and hence the sensitivity of the decoder is high for large signal amplitudes and low for small ones.

Suppose, next, that the signal sample as coded has the magnitude +6. As shown in the tabulation of Fig. 3, this is represented by the code pulse group 011001. The coder of Fig. 6 generates this code pulse group which is transmitted to the receiver station where the several pulses of the group are distributed by the delay devices 32 to their respective switches in a fashion such that the $S_1$ switch is thrown to the left. As before, the switch $S_2$ is closed, the switch $S_3$ is closed, the switch $S_4$ is open, the switch $S_5$ is open and the switch $S_6$ is closed. The resulting voltage drop across the network, in the absence of the degenerative feedback, is thus negative and proportional to $-16-8-0-0-1=-25$, and the net voltage at the network output point 3 is hence $31-25=6$.

If the signal sample had had the magnitude —6, the $S_1$ switch would have been thrown to the right by the first digit pulse, as called for in the tabulation of Fig. 3, while the switches $S_2$, $S_3$, $S_4$, $S_5$ and $S_6$ would be opened and closed as before. As a result the drop across the network would be +16, +8, +0, +0, $+1=+25$ volts. This voltage drop would be overbalanced by the bias of —31 volts from the source —V to leave at the network output point a net voltage proportional to $-31+25=-6$.

A train of pulses recurring at the code group rate may be generated by a timing wave source 34 coupled to the output point of the regenerator 31 and a divider 35. Each of these pulses may be located at the correct instant on the time scale as by a variable delay device 36, and there employed to time the operation of a sampler 37. The latter picks off the network voltage drop which obtains when each code pulse group is properly distributed along the distributor of delay devices 32, so that each pulse only operates the S switch for which it is intended, and no other. The sampler 37 then delivers its decoded output to any desired utilization circuit by way of an output conductor 38.

Figure 9:
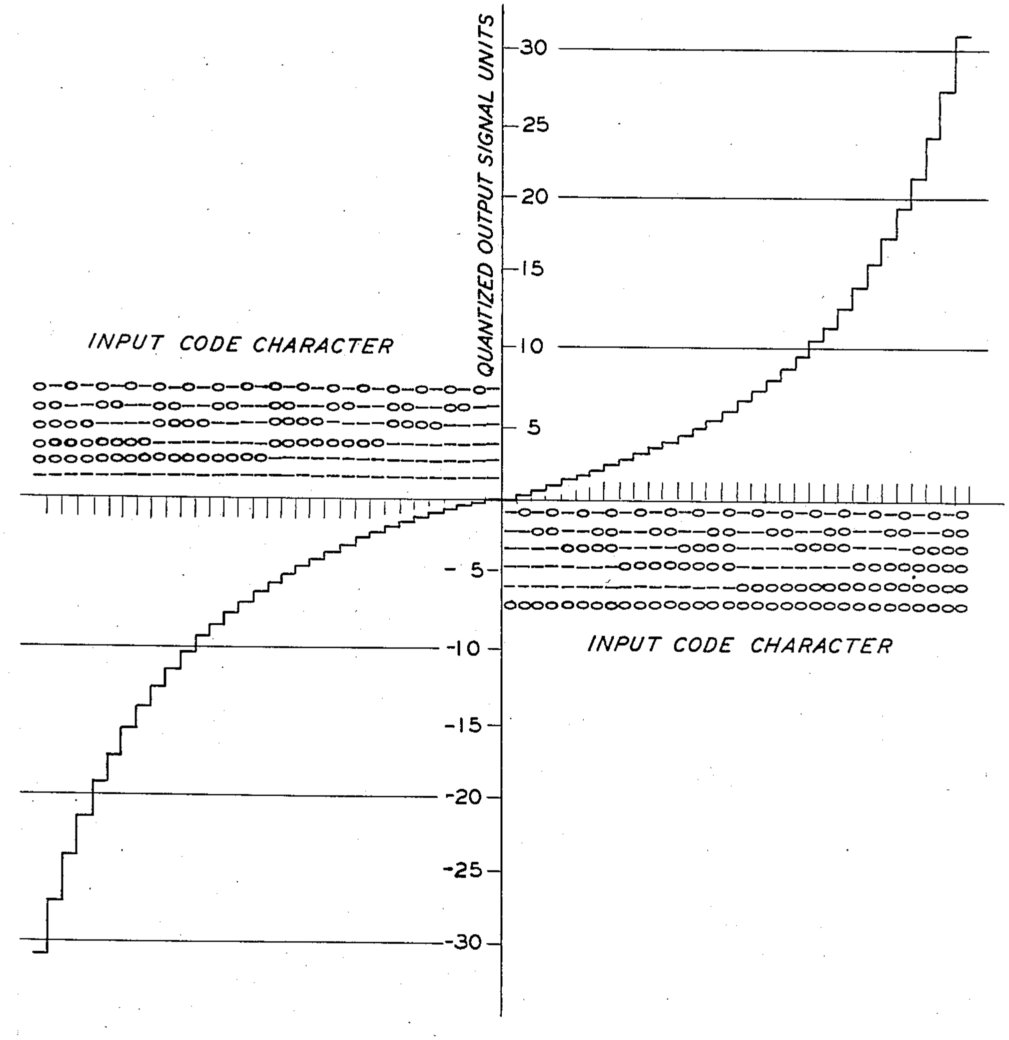
Fig. 9 is a balanced input-output characteristic obtainable with the decoder of Fig. 7.

Hence the decoder of Fig. 7 reconverts each incoming code pulse group correctly into the signal amplitude sample from which it was originally derived, the first digit of each pulse group determining its polarity and the remaining digit pulses determining its absolute magnitude. At the same time the degenerative feedback which follows from the inclusion in the circuit of the phase-inverting amplifier 8 and the load resistor $R_L$ produces an input-output characteristic having a volume range expansion feature. The resulting input-output characteristic of this decoder is shown in Fig. 9.

In Figs. 6 and 7 the switches $S_2$, $S_3$, $S_4$, $S_5$ and $S_6$ are required to pass current equally well in two opposite directions, positive and negative. Many electronic devices are available which operate in this fashion. In some circumstances, however, it may be desired to take advantage of the simplicity and ruggedness of a diode And gate as a switch. Such gates, however, do not have the bi-directional property. Accordingly, minor modifications may be made in the circuit to permit the use of such diode gates.

Figure 10:
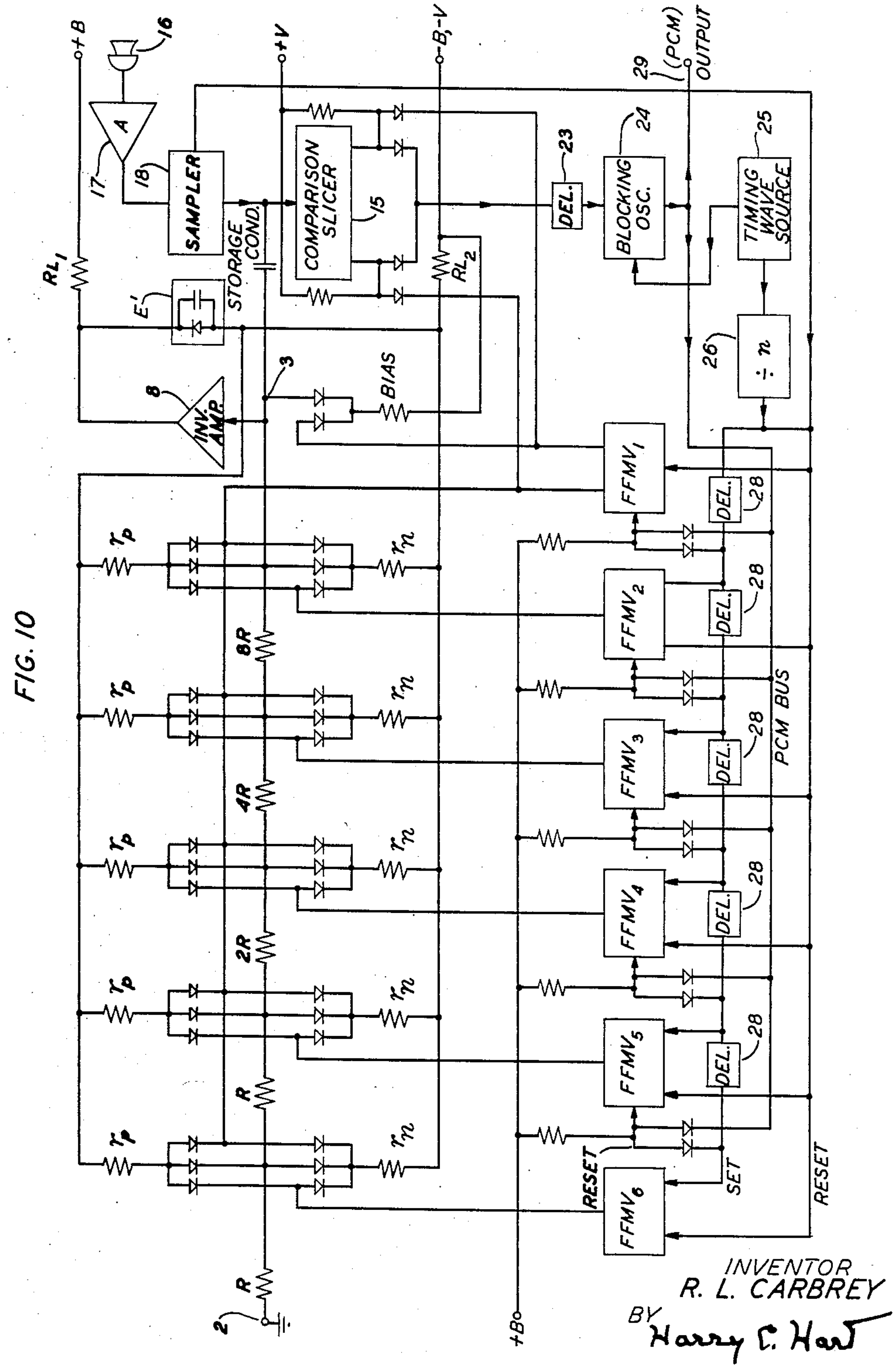
Fig. 10 is a circuit diagram showing a variant of the circuit of Fig. 6.

Fig. 10 is a schematic diagram showing a coder circuit, alternative to that of Fig. 6, in which such modifications have been made. Here each tap of the resistor adding network is connected to two oppositely poled diode And gates. Taking the left-hand gate by way of example, the three upper diodes serve with the resistor $r_p$ in place of the switch $S_6$ of Fig. 6 in the case of positive currents, while the three lower diodes with the resistor $r_n$ serve in the same fashion for negative currents. The two gates are opened or closed together by the control pulse output from the sixth flip-flop multivibrator. The output from the left-hand output terminal of the first flip-flop multivibrator determines which of the two gates, the upper one or the lower one, shall respond to the control pulse from the sixth multivibrator. If it be the upper one, positive currents are drawn from the positive source +B. If it be the lower one, negative pulses are drawn from the source —B.

For the sake of simplicity and ruggedness all other switches of Fig. 6 are likewise replaced by unidirectional diode gates. They are biased for operation according to the rules of Fig. 6 by appropriate biasing sources and are controlled by the output pulses of the first flip-flop multivibrator and by the group rate pulse output of the divider, respectively.

As a practical matter, the supplementary potential source —E of Fig. 6 is replaced in Fig. 10 by a voltage regulating diode E′, bypassed by a condenser. This diode may be of the sort which forms the subject of W. Shockley Patent 2,714,702, granted August 2, 1955. For the rest, the circuit connections of Fig. 10 are the same as those of Fig. 6.

Figure 11:
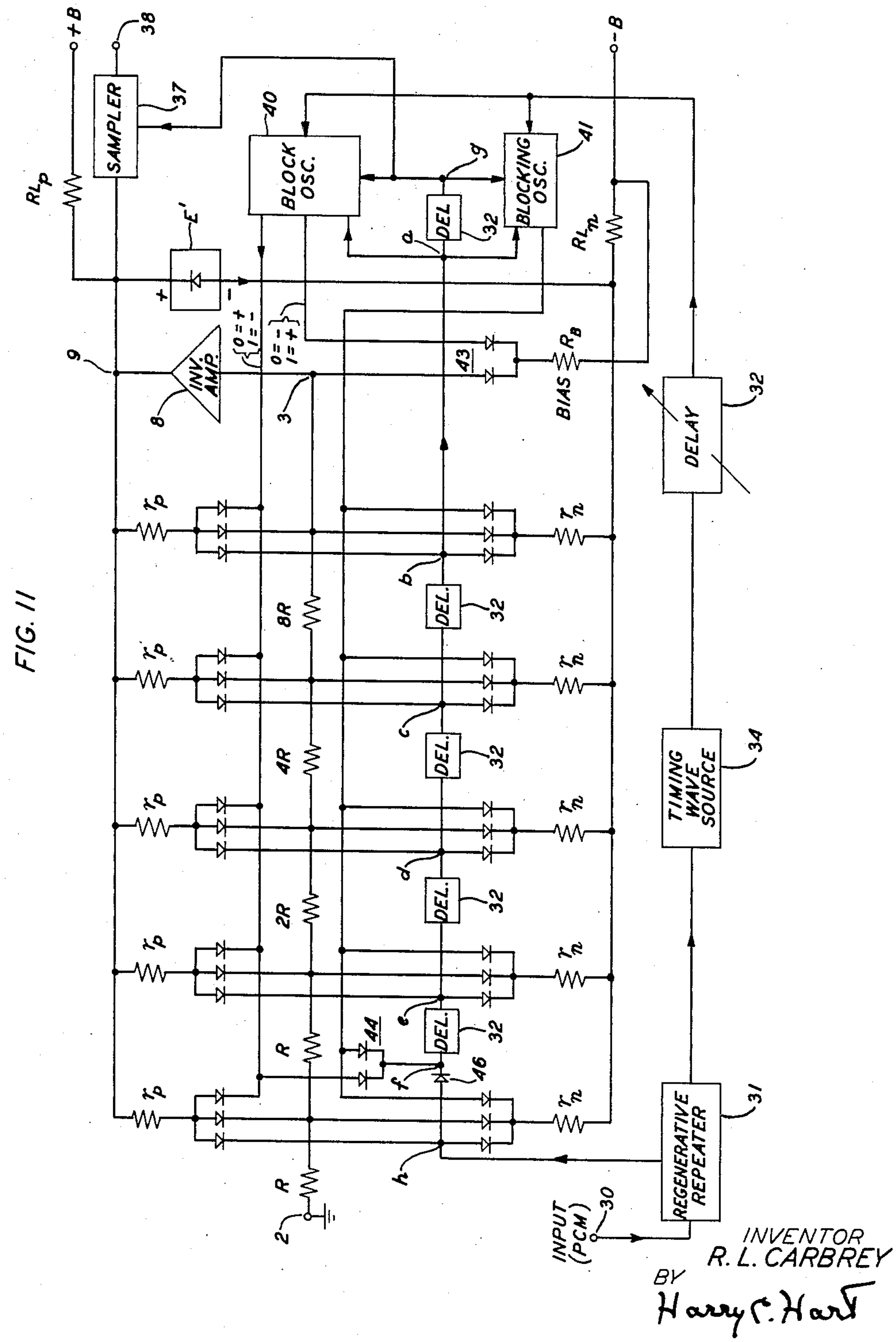
Fig. 11 is a circuit diagram showing a variant of the the circuit of Fig. 7.

Fig. 11 is a schematic diagram showing a decoder circuit alternative to that of Fig. 7 in which similar modifications have been made; i.e., each of the S switches of Fig. 7 is replaced by two oppositely poled diode And gates. All of the upper And gates are partially enabled, to admit positive currents to the adding network, by application to their right-hand diodes of a positive pulse output from an upper blocking oscillator which is enabled when the first digit of each incoming code pulse group is an On pulse. Similarly the lower And gates are partially enabled by a negative pulse output of a lower blocking oscillator when the first digit is an Off pulse. Completion of the enablement of the several gates of the upper group or of the lower group as the case may be is carried out in the fashion described above by the remaining digit pulses of each code pulse group.

It is a feature of the apparatus of Fig. 11 that the tandem arrangement of delay devices 32 does double duty, first as a distributor of the several pulses of each incoming group to their assigned And gates and second to ensure that the proper And gates shall be enabled at the proper times, that the proper balancing bias shall be applied to the adding network, and that the network voltage shall be sampled to provide an output at the proper instants. The manner in which these two functions are carried out will be clear from the following explanation.

Assume that a particular pulse group is properly distributed along the delay line comprising the delay devices 32; i.e., the first digit pulse appears at the point *a*, the second at the point *b*, the third at the point *c*, the fourth at the point *d*, the fifth at the point *e* and the sixth at the point *f*. At this instant the sixth pulse of the prior group is located at the point *g*. Assume, now, that the sixth pulse of the prior group, which may be an On pulse or an Off pulse in accordance with the code of Fig. 3, shall have been replaced by a masking pulse which always takes the form of an On pulse and which, to distinguish it from the information carrying pulses, is of a different amplitude, e.g., twice the amplitude of one of the group pulses. This masking pulse is applied simultaneously to the adding network output sampler 38, to an upper blocking oscillator 40 and to a lower one 41, to partially enable both of these blocking oscillators. The first pulse of the following group, i.e., the group under consideration, is also applied to both of these blocking oscillators, and their construction is such that if this first pulse is an Off pulse, the lower oscillator 41 is enabled while if it is an On pulse, the upper one 40 is enabled. Enablement of the lower blocking oscillator 41 regenerates the masking pulse which, in turn, partially enables the lower diode And gates as described above, for admission of negative currents to the adding network as required for a code pulse group representing a signal of positive polarity. Enablement of the upper blocking oscillator 40 regenerates the masking pulse which, in turn, acts to partially enable the upper diode And gates for code pulse groups representing signals of negative polarity. It also, by way of a pair of diodes 43, applies a balancing bias to the adding network.

The masking pulse output of the upper blocking oscillator 40 or of the lower one 41, as the case may be, is applied by way of one of the diodes of a second pair 44 to the point *f*, from which point it travels through the delay devices 32 in succession to the point *g*, occupying the period of an entire code pulse group to do so. When it reaches the point *g* it is in a position to initiate repetition of the foregoing operations for the ensuing code pulse group.

The obliteration of the sixth pulse of each group at the point *f* by the masking pulse does not adversely affect the decoding operation, because the masking pulse is isolated from the point *h* by a diode 46. Hence, for the purpose of operating the sixth And gate, the sixth pulse is not masked, while for the purpose of controlling the blocking oscillators 40, 41 and the output sampler 37, it is masked.

Precise timing of the operations of the upper and lower blocking oscillators 40, 41 may be achieved through the inclusion of a timing wave source 34 which generates a train of pulses at the pulse repetition rate of the system under control of the incoming code pulse train.

For correct phasing of the masking pulse with respect to the initial and terminal instants of the successive code pulse groups or, in short, for correct "framing" of the system, it suffices that the incoming pulse train shall contain, at some preestablished instant, of each regular sequence of incoming pulse groups, a marker pulse of any suitable variety. Such a marker pulse may be deliberately inserted or it may be found inherently as a consequence of the statistics of the code. Instrumentalities and techniques are well known by which such a marker pulse may be recognized, distinguished from the information carrying code group pulses, and turned to account for the correct framing of the operations of the system. Suitable means of this character are shown, for example, in J. G. Kreer et al. Patent 2,527,638, October 31, 1950, in E. Peterson Patents 2,527,649 and 2,527,650, both granted October 31, 1950, and in E. Peterson Patent 2,546,316, granted March 27, 1951.

Figure 12:
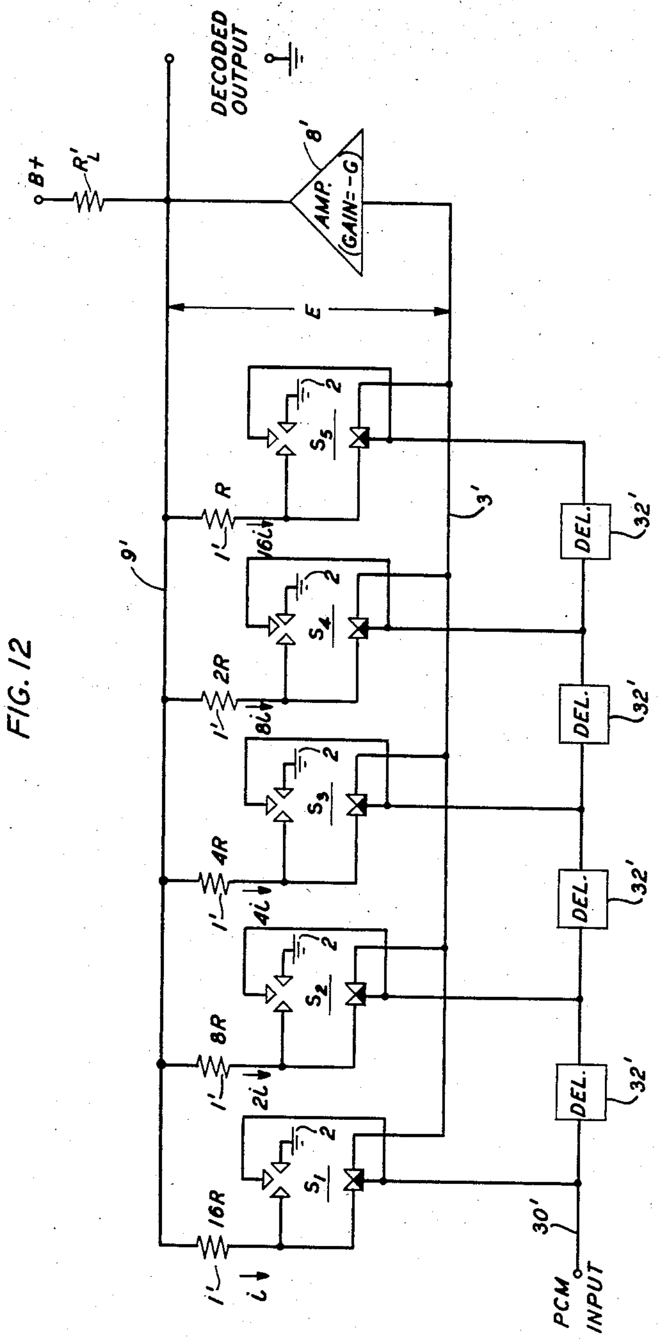
Fig. 12 is a circuit diagram illustrating the instrumentation of the invention by a current-addition network.

Fig. 12 is a schematic circuit diagram illustrating the practice of the invention by way of a current addition network. Here the arithmetical elements are a group of resistors 1' of magnitudes R, 2R, 4R, 8R, 16R . . . five such being shown for a five-digit code, representing signal sample magnitudes which are all of the same polarity and lie in the range 0–31. The upper ends of all of these resistors are connected by way of a common conductor 9' and a load resistor $R_L'$ to an energy source $B^+$ and their lower ends are individually connected by way of the conduction terminals of switches $S_1$, $S_2$, $S_3$, $S_4$, $S_5$ to a common reference conductor 3'. As in the other figures, these switches S are so arranged that each resistor 1' is connected in the "switch closed" condition to this reference conductor 3' while in the "switch open" position it is connected directly to a ground point 2. The reference conductor 3' is connected to the input terminal of a phase-inverting amplifier 8' of gain factor G and the amplifier output terminal is connected to the upper conductor 9' and thus to the output terminals of the apparatus. The system is illustrated as embodied in a decoder, so that code groups of pulses, incoming at an input terminal 30', are distributed by a group of delay devices 32' to the control terminals of their assigned switches S in the fashion above described in detail in connection with Fig. 7.

The connection of the lower reference conductor 3 by way of the phase-inverting amplifier 8' to the upper reference conductor constitutes a degenerative feedback path which operates in the same fashion as do the degenerative feedback paths of the other figures. Here, however, the input and output impedances of the amplifier should be so selected that it operates as a current amplifier as distinguished from the voltage amplifiers of the earlier figures.

With this arrangement the currents flowing through the various resistors 1' of the addition network are inversely proportional to the magnitudes of the resistors, as indicated in the figure. Thus, in the last resistor 1', of magnitude 16R, the current *i* is given by $$i=\frac{E}{16R}$$

where E is the common applied voltage. The sum of all of these currents flows from the source $B^+$ through the load resistor $R_L'$ and has the magnitude $31i$. Hence, without the operation of the feedback path, the potential difference E applied across each resistor 1' of the network has the magnitude $$E_0=B-31iR_L$$

The operation of the feedback path is to modify this voltage in dependence on the sum of the currents through the closed switches. With an amplifier of gain factor G in the degenerative feedback path the modifying factor is evidently $$-niR_LG$$

where $n$ is some integer between 0 and 31, inclusive, and is also the decoded counterpart of the pattern of closures of the several switches S.

Hence, the actual voltage E between the lower reference conductor and the upper reference conductor is given by $$E=B-31iR_L-niR_LG=16Ri$$

whence $$i=\frac{B}{16R+31R_L+nR_LG}$$

This expression shows that the larger the value of $n$, the smaller the current $i$, and vice versa. Hence, for small signal amplitudes, current increments are large, and vice versa. In other words, the input-output characteristic of the apparatus has the same nonlinear character as do those of Fig. 2, as required for the purposes of applicant's problem.

In the foregoing description, the invention has been illustrated by apparatus for translating to or from the binary code. It may be extended in a straightforward fashion to apparatus for translating to or from a permutation case of any base $b$. Thus, for example, in the case of the ternary code in which the base is three and each digit position may contain a pulse having any one of three values, e.g., 0, 1 or 2, the elements of the adding network may be proportioned so that the various sums of any number of them, taken in succession from a reference point, are proportional to the successive integral powers of three, while the "S" switches, which respond either to the incoming pulses of a code group in the case of a decoder or to a succession of test pulses in the case of a coder, may be three-position switches instead of the two-position switches of the figures. In one of these three positions the value of the current admitted to the network by its closure is zero; in the second position the current admitted by the closure of the switch is of a first standard value, and in the third position it is of a second standard value, for example twice the first standard value.

Still other refinements and extensions of the invention will suggest themselves to those skilled in the art.

What is claimed is:

1. In a system that utilizes signals in the form of amplitude samples at one point and, at another point, utilizes signals in the form of groups of pulses arranged in accordance with a permutation code of base $b$, each such pulse group having the same information content as one of said amplitude samples, apparatus for effecting a nonlinear translation from one of said forms into the other form without alteration of said information content which comprises a network having a plurality of interconnected impedance elements, the magnitudes of the several elements being related as the various integral powers of $b$, means for selectively applying signals of like magnitudes to said several elements to produce an electrical condition in said network of which the pattern of said applied signals is the permutation code counterpart, to the base $b$, and feedback means, responsive to the magnitude of said condition, for modifying the magnitudes of all of said signals alike.

2. Apparatus as defined in claim 1 including means for connecting the several network elements together in tandem.

3. Apparatus as defined in claim 1 wherein said feedback means includes a phase-inverting device, whereby the feedback is degenerative.

4. In combination with apparatus as defined in claim 1, means responsive to a selected pulse of said code pulse group for determining the polarities of the signals applied to said network as negative, to produce a negative network electrical condition for all signal ampltiude samples of one polarity, and means responsive to said selected pulse for balancing the maximum value of said negative condition by a positive bias.

5. In combination with apparatus as defined in claim 1, means responsive to a selected pulse of said code pulse group for determining the polarities of the signals applied to said network as positive, to produce a positive network electrical condition for all signal amplitude samples of one polarity, and means responsive to said selected pulse for balancing the maximum value of said positive condition by a negative bias.

6. In combination with apparatus as defined in claim 1, means responsive to a selected pulse of said code pulse group for determining the polarities of the signals applied to said network as negative, to produce a negative network electrical condition for all signal ampltiude samples of one polarity, means responsive to said selected pulse for balancing the maximum value of said negative condition by a positive bias, and means responsive to said selected pulse of said code pulse group for determining the polarities of the signals applied to said network as positive, to produce a positive network electrical condition for all signal amplitude samples of the opposite polarity, and means responsive to said selected pulse for balancing the maximum value of said positive condition by a negative bias.

7. In a system for effecting a nonlinear translation from a permutation code group of pulses as an input signal into an amplitude sample as an output signal which corresponds, by way of a preassigned nonlinear relation, with said pulse group, apparatus as defined in claim 1 and, in combination therewith, means controlled by the several pulses of an incoming pulse group for operating said several signal-applying means, and means for utilizing the electrical condition produced in the network as an output.

8. In a system for effecting a nonlinear translation from an amplitude sample as an input signal into a permutation code group of pulses as an output signal which corresponds, by way of a preassigned nonlinear relation, with said amplitude sample, apparatus as defined in claim 1 and, in combination therewith, means for applying in systematic succession, test code pulse groups to said signal-applying means, means for concurrently comparing the resulting network electrical condition with the input amplitude sample to identify that one of a plurality of different discrete condition magnitudes which most nearly resembles the sample amplitude, and means for generating an output code pulse group having a permutation like that of the test pulse group from which said identified condition results.

9. Apparatus for decoding incoming binary code groups of two-valued pulses arranged in accordance with the binary code, each such group representing a wave amplitude sample, which comprises means responsive to a pulse of the lowest denominational oder for developing a first order signal of preassigned magnitude, means responsive to each higher denominational order pulse for developing a higher order signal, the magnitude of each such higher order signal being twice that of the signal of next lower order, means for additively combining the signals thus developed for all the pulses of each group to form a resultant signal, whereby said resultant signal is proportional to said amplitude sample, and means for feeding back said resultant signal to modify said preassigned magnitudes.

10. Apparatus for decoding incoming binary code groups of two-valued pulses, each pulse in one value representing a portion of the amplitude of a signal wave, which comprises a plurality of pulse-responsive switches, one for each element of said code, means responsive to the operations of said several switches for generating component voltages related in magnitude as inverse powers of two, means for applying each pulse of an incoming code group to its assigned switch, thereby selectively to generate said component voltages, means for additively combining said generated voltages to form a sum, feedback means responsive to the magnitude of said sum for reducing the magnitudes of all said component voltages, thereby to reduce said sum, and means for indicating the magnitude of said sum as thus reduced.

11. Apparatus for decoding incoming binary code groups of two-valued pulses arranged in accordance with the binary code, each such group representing a single signal wave amplitude, which comprises a network of $n$ resistors having ohmic values related as powers of two and connected in series in the order of ascending ohmic value to a load, means responsive to a pulse of each denominational order for applying a current of preassigned magnitude to the end point of that one of said resistors whose ohmic value corresponds to said denominational order, whereupon said current flows through said one resistor and, in series, through all of said resistors of lower ohmic value, thereby to develop a voltage, for each pulse, of a magnitude representative of the denominational significance of said pulse, means for additively combining the voltages thus developed for all the pulses of each group to derive a resultant voltage, whereby said resultant voltage is proportional to the wave amplitude represented by said pulse group, and means including a phase-inverting amplifier for feeding back said resultant voltage to reduce said preassigned current magnitude.

12. Apparatus for decoding incoming binary code groups of two-valued pulses, each pulse in one value representing a portion of the amplitude of a signal wave, which comprises a network of $n$ resistors having ohmic values related as powers of two and connected in series in the order of ascending ohmic value across a load, a pulse-responsive switch of which one conduction terminal is connected to the end point of each of said resistors which is most proximate to said load, a source of current of preassigned magnitude connected to the other terminals of all of said switches, means for distributing each pulse of each incoming group to control that switch which is connected to the resistor representing the same amplitude as is represented by said distributed pulse, thereby to develop across said load a voltage drop proportional to the total wave amplitude represented by an entire pulse group, means for developing a control signal that is related in magnitude to said load voltage drop and in phase opposition thereto, and means for feeding back said control signal effectively to reduce the preassigned magnitude of the current of said source.

13. Apparatus for converting an amplitude sample of a wave of limited full amplitude range into a group of two-valued pulses arranged in accordance with the binary permutation code, each pulse representing a portion of said amplitude range, which comprises means for generating a sequence of timing pulses, means responsive to the first pulse of said sequence for developing a pedestal signal of one half said full amplitude range, means responsive to each following pulse of said sequence for developing a pedestal signal of one half the magnitude of the signal developed in response to the prior pulse, means for accumulating said pedestal signals in succession as they occur, to form a sequence of pedestal signal sums, means for comparing the magnitude of a signal amplitude sample with each of said pedestal signal sums in turn to derive, for each such comparison, a difference signal, means responsive to a difference signal of one polarity for delivering an output On pulse and responsive to a difference signal of opposite polarity for delivering an output Off pulse, means responsive to each such output On pulse for removing the pedestal signal last added, and feedback means responsive to each pedestal signal sum for reducing the magnitudes of all the pedestal signals contributing to said sum.

14. Apparatus for translating an incoming signal amplitude sample into binary code groups of two-valued pulses, each pulse in one value representing a portion of the amplitude of said sample, which comprises a plurality of pulse-responsive switches, one for each element of said code, means responsive to the operations of said several switches for generating component voltages related in magnitude as inverse powers of two, a source of timing pulses, means for applying timing pulses to the control terminals of said switches in systematic succession, thereby selectively to actuate said switches and so to generate said component voltages, means for additively combining said generated voltages to form sums, feedback means responsive to the magnitude of said sums for reducing the magnitudes of all said component voltages, thereby to reduce said sums, means for sequentially comparing said amplitude sample with said sums, means for identifying that one of said sums which most nearly resembles said sample, and means for generating an output code pulse group of a pattern like that of the actuated switches from which said identified sum results.

15. Apparatus for converting an amplitude sample of a wave of limited full amplitude range into a group of two-valued pulses arranged in accordance with the binary permutation code, each pulse representing a portion of said amplitude range, which comprises a network of $n$ resistors having ohmic values related as ascending powers of two and connected in series in the order of ascending ohmic value between a reference point and a load, a pulse-responsive switch of which one conduction terminal is connected to the end point of each of said resistors which is most proximate to said load, a source of current of preassigned magnitude connected to the other terminals of all of said switches, whereby actuation of any of said switches causes the flow of current of preassigned magnitude through one or more of said resistors, thereby to generate a component voltage, said component voltages being related in magnitude as ascending powers of two, means for generating a sequence of timing pulses, means for applying said timing pulses in systematic succession to the control terminals of said several switches in systematic succession, means for accumulating said component voltages in succession as they occur to form a sequence of component voltage sums, means for comparing the magnitude of a signal amplitude sample with that of said component voltage sums in turn to derive, for each such comparison, a difference signal, means responsive to a difference signal of one polarity for delivering an output On pulse and to a difference signal of opposite polarity for delivering an output Off pulse, means responsive to each such output On pulse for disabling the switch last actuated, and feedback means responsive to each component voltage sum for reducing the magnitudes of all the component voltages contributing to said sum.

16. In a system that utilizes signals in the form of amplitude samples at one point and, at another point, utilizes signals in the form of groups of pulses arranged in accordance with a permutation code of base $b$, each such pulse group having the same information content as one of said amplitude samples, apparatus for effecting a nonlinear translation from one of said forms into the other form without alteration of said information content which comprises a network having a plurality of impedance elements of successively higher orders interconnected in additive relation between an energy source and a reference point, the magnitudes of said several elements being related as the various integral powers of the base $b$, means for selectively applying electrical conditions of a first kind and of like magnitudes to said several elements to actuate them and so to produce, at said reference point, an electrical condition of a second kind that is proportional to the sum of said applied electrical conditions of the first kind, the magnitudes of said several elements being such that application of a condition of the first kind to any one of them alone increases said sum by a factor 2, as compared with the sum given rise to by actuation of the element of next lower order alone, and feedback means, responsive to the magnitude of said sum conditions, for similarly modifying the magnitudes of all of said applied conditions of the first kind.

17. Apparatus as defined in claim 16 including means for connecting the several network elements together in tandem between the energy source and the reference point.

18. Apparatus as defined in claim 16 including means for connecting the several network elements in parallel between the energy source and the reference point.

References Cited in the file of this patent

UNITED STATES PATENTS

| | | |
|---|---|---|
| 2,579,302 | Carbrey | Dec. 18, 1951 |
| 2,806,950 | Carbrey | Sept. 17, 1957 |